United States Patent
Sriram

(10) Patent No.: US 7,720,311 B1
(45) Date of Patent: May 18, 2010

(54) MEMORY AND COMPUTE EFFICIENT BLOCK-BASED TWO-DIMENSIONAL SAMPLE-RATE CONVERTER FOR IMAGE/VIDEO APPLICATIONS

(75) Inventor: Parthasarathy Sriram, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 794 days.

(21) Appl. No.: 11/072,080

(22) Filed: Mar. 3, 2005

(51) Int. Cl.
*G06K 9/32* (2006.01)

(52) U.S. Cl. .................................................. 382/299
(58) Field of Classification Search .................. 382/299
See application file for complete search history.

(56) References Cited

U.S. PATENT DOCUMENTS

| | | | |
|---|---|---|---|
| 6,539,120 B1 * | 3/2003 | Sita et al. ..................... 382/233 |
| 6,690,836 B2 * | 2/2004 | Natarajan et al. ............ 382/250 |
| 7,277,101 B2 * | 10/2007 | Zeng ............................ 345/600 |
| 2004/0150841 A1 * | 8/2004 | Lieberman et al. ........... 358/1.2 |
| 2005/0008254 A1 * | 1/2005 | Ouchi et al. ................. 382/284 |

* cited by examiner

*Primary Examiner*—Aaron W Carter
*Assistant Examiner*—Stephen R Koziol

(57) ABSTRACT

A new technique for image sample-rate conversion can be efficiently implemented with respect to memory, bandwidth and computational requirements. According to one aspect, the technique takes advantage of certain inherent similarities and symmetries within the image data to limit switching of filters during processing and to otherwise process the data in an efficient order. According to another aspect, the technique can be implemented within a decoding pipeline such as a JPEG/MPEG decoding pipeline in such a way that multiple transfers of image data in and out of the external memory can be avoided. According to a still further aspect, where polyphase filters are used, computationally-efficient filters are chosen for use with the image conversion process. The technique is amenable to both hardware and software based implementations.

30 Claims, 9 Drawing Sheets

FIG. 1 (PRIOR ART)
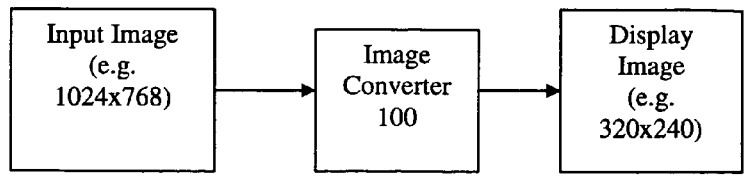
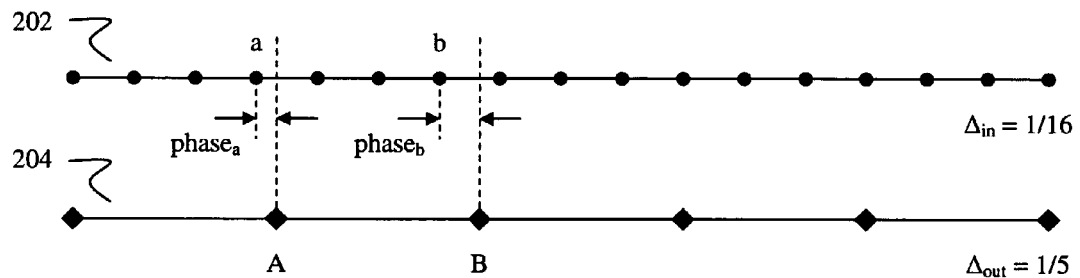
FIG. 2 (PRIOR ART)
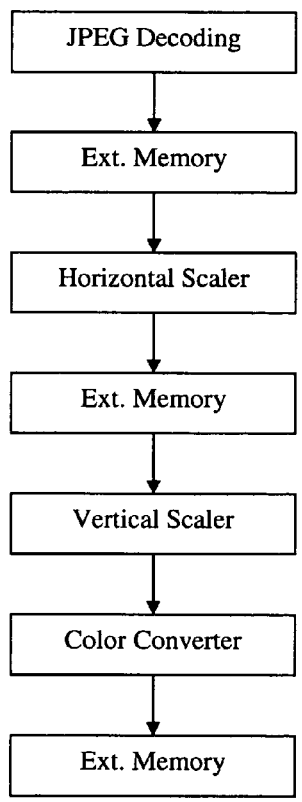
FIG. 4 (PRIOR ART)

| Output (1,1) | Output (2,1) | Output (3,1) | .... | Output (I,1) |
|---|---|---|---|---|
| Filter for row 1<br><br>Index of input pixel(s) | Index of input pixel(s) | Index of input pixel(s) | | Index of input pixel(s) |
| Output (1,2) | Output (2,2) | Output (3,2) | .... | Output (I,2) |
| Filter for row 2<br><br>Index of input pixel(s) | Index of input pixel(s) | Index of input pixel(s) | | Index of input pixel(s) |
| .<br>.<br>. | .<br>.<br>. | .<br>.<br>. | .... | .<br>.<br>. |
| Output (1,N) | Output (2,N) | Output (3,N) | .... | Output (I,N) |
| Filter for row N<br><br>Index of input pixel(s) | Index of input pixel(s) | Index of input pixel(s) | | Index of input pixel(s) |

FIG. 8A

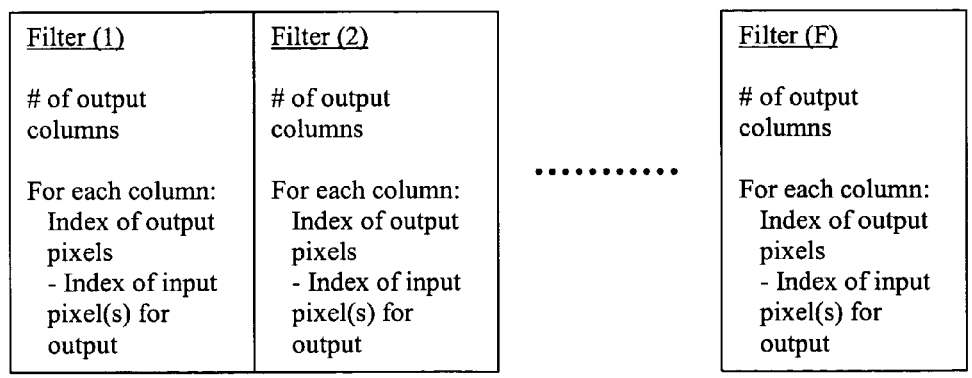

FIG. 8B

MEMORY AND COMPUTE EFFICIENT BLOCK-BASED TWO-DIMENSIONAL SAMPLE-RATE CONVERTER FOR IMAGE/VIDEO APPLICATIONS

FIELD OF THE INVENTION

The present invention relates generally to image and video processing, and in particular to a sample rate conversion process and apparatus that can efficiently scale two-dimensional video frames and images.

BACKGROUND OF THE INVENTION

Taking and displaying of still and video images are becoming ubiquitous. Consider, for example, the recent explosion in the popularity of cameras in cell phones and image/video displays in portable music players, for example.

Resolutions of image/video content that are available in the market place today vary quite dramatically. For example, digital still cameras are capable of producing images whose resolutions currently can vary from as small as 320×240 pixels to as large as 3072×2048 pixels.

Meanwhile, typical display units like a TV monitor or a LCD display in hand-held devices are only capable of displaying images with much smaller resolutions. For example, TV monitors generally support images at NTSC or PAL resolution (720×280 or 720×576, respectively) while most low-cost LCD display units support images up to 320×240 pixels. Obviously, the input images are significantly greater than the resolutions typically supported by the display units.

There are two known ways to handle this mismatch. In the first, the display rectangle can be overlaid on top of the larger image. The user can then interactively move the cursor to view different regions of the larger image (i.e. panning). The second way is to scale the entire input image to fit to the dimensions of the display window (i.e. scaling). Both schemes have advantages and disadvantages and therefore it is a general practice to support both schemes. For example, in the first scheme, only the portion of the picture is visible to the viewer at any time, while in the second scheme, the image has to be modified to fit the viewing area.

For the second scheme, a two-dimensional sample-rate converter (i.e. scaler) is typically used. Accordingly, as shown in FIG. 1, an image converter 100 receives an input image and up-scales or down-scales the image to produce an output display image in accordance with the resolution of the input image and the resolution of the display. Since the input resolutions of the images can change from image to image, the up-sampling/down-sampling ratio (the ratio of the output dimension to the input dimension) can also change from image to image, even if the image display resolution remains the same.

In addition, the spatial relationship between input and output samples also changes, on a sample-by-sample (i.e. pixel-by-pixel) basis. For example, assume that there is a need to down-sample an image by a factor of 5/16. In other words, for each row and column of sixteen input samples, five output sample will need to be created. In such an example, as shown in FIG. 2, pixels a and b are input samples in an input image row 202 having sixteen input samples and pixels A and B are output samples in an output image row 204 that need to be calculated. Depending on the spatial location of the output pixels with respect to the input pixels, the formula to calculate the output pixel value can change.

More particularly, poly-phase filters are typically used to compute the output pixel values. In such a technique, the filter that is used for each output sample is selected dynamically from a predetermined set of filters depending on the sampling ratio that needs to be achieved and the spatial relationship or phase between the output sample and the input sample(s). Accordingly, with reference to FIG. 2, the filter that is applied to the input samples to compute output pixel A will likely be different from the filter that is applied to the input samples to compute pixel B, given the different spatial relationship or phase between input pixels a and b, respectively (i.e. $phase_a \neq phase_b$). This approach, when applied on a sample-per-sample basis as is conventionally done, consumes considerable computation resources, and thus makes implementing such techniques in any time critical application quite challenging.

An example of a conventional horizontal scaling process using poly-phase filters will now be described in more detail in connection with FIG. 3, and the example down-sampling ratio illustrated in FIG. 2.

As shown in FIG. 3, processing begins in step S302 by determining the index of the first/next output sample to compute. Referring to FIG. 2, the first output sample to be computed corresponds to sample A, which has an index of 1. Next, in step S304, the index of the corresponding input sample is determined based on the scaling factor. With reference to the example of FIG. 2, this is obtained by trunc (output index*$\Delta_{out}/\Delta_{in}$)=trunc (1*16/5)=trunc (3.2)=3.

Processing advances to step S306, where the filter to apply to the input sample(s) including and adjacent to input index 3 (i.e. pixel a) is selected. This is typically determined based on the spatial relationship between the given input sample and output sample. For example, a set of filters is predetermined and indexed in order depending on the increasing size of spatial "error" or phase between the output sample and the input sample. Accordingly, referring to FIG. 2, the index of the filter to use for determining output sample A will be lower than the index of the filter to use for determining output sample B, given that output sample A is spatially closer to corresponding input sample a than output sample B is relative to corresponding input sample b (i.e. $phase_a<phase_b$). More specifically, for output sample A, the phase or error with respect to the corresponding input sample a is determined as rem (output index*$\Delta_{out}/\Delta_{in}$)=rem (1*16/5)=rem (3.2)=0.2, and the index of the filter to select is determined by round (error*# phases). In an example where a set of 8 poly-phase filters are used, the index of the filter to select is round (0.2*8)=round (1.6)=2. Alternatively, the filter index can be determined by rem (round (# phases*(output index*$\Delta_{out}/\Delta_{in}$))/# phases)=rem ((round (8*(1*16/5)))/8)=rem (round (25.6)/8) =rem (26/8)=2.

In step S308, the selected filter is applied to the input sample(s) to calculate the output sample. Depending on the number of taps in the filter, the corresponding number of input samples adjacent to and including the determined input sample will be retrieved and used to calculate the output sample.

In step S310, it is determined whether the end of the row of output samples has been reached. If not, processing returns to step S302. Otherwise processing advances to step S312, where it is determined if the last row of output samples has been calculated. If so, horizontal scaling processing ends. Otherwise processing advances to step S314, where the output index is reset to the beginning of the next row before returning to step S304.

It should be noted that vertical scaling can be performed in similar fashion as described in connection with FIGS. 2 and 3 above. It should be further noted that the conventional approach to scaling, when applied on a sample-per-sample basis as is conventionally done, consumes considerable computation resources, and thus makes implementing such techniques in any time critical application quite challenging.

In addition to the afore-mentioned problems with conventional scaling techniques, the pixel data to the scaler unit typically arrives as two-dimensional blocks of varying sizes. For example, the scaler unit may be part of a processing pipeline including a JPEG or MPEG decoder. The output of a JPEG decompression module may include block sizes of 8×8, 16×16, 16×8 and 8×16 (an MPEG decoder block output is typically 16×16). As a result, most current systems will separate the JPEG/MPEG decoding process from the scaling process.

More particularly, as shown in FIG. 4, since the amount of SRAM is limited in most embedded processors, the image will first be decoded by a JPEG decoder and stored in external memory and then will be read again from memory for the scaling process. Further, since the scaling is a two-dimensional process, typically, because of memory constraints, the images will first be horizontally scaled on a pixel-line basis, stored back to external memory, and then the horizontally-scaled pixel lines will be read from memory, and vertically scaled to obtain the desired resolution. This involves multiple reads and writes to the external memory.

Accordingly, it would be desirable if a sample-rate conversion technique could efficiently convert images without the computation, memory and bandwidth requirements of conventional techniques that are applied in standard pipelines such as a JPEG or MPEG decoding pipeline.

SUMMARY OF THE INVENTION

The present invention introduces a new technique for image sample-rate conversion that can be efficiently implemented with respect to memory, bandwidth and computational requirements. According to one aspect, the present invention takes advantage of certain inherent similarities and symmetries within the image data to limit switching of filters during processing and to otherwise process the data in an efficient order. According to another aspect, the present invention can be implemented within a decoding pipeline such as a JPEG/MPEG decoding pipeline in such a way that multiple transfers of image data in and out of the external memory can be avoided. According to a still further aspect, where poly-phase filters are used, computationally-efficient filters are chosen for use with the image conversion process. The present invention is amenable to both hardware and software based implementations.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIG. 1 is a block diagram of an image converter for scaling an input image to a desired output display image;

FIG. 2 illustrates how filters for scaling an input image can be dependent on spatial relationships between input samples and output samples;

FIG. 4 is a block diagram of a conventional image conversion pipeline;

FIGS. 8A and 8B are diagrams illustrating pre-processing values that can be prepared and used during a sample-rate conversion process according to the invention;

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Generally, according to one aspect, the present invention recognizes that certain inherent similarities and symmetries will exist within the input image data and overall filtering process for a given scale factor to be applied to input images with a given resolution. Accordingly, for a given input resolution, a desired output resolution, and a known set of filters, the present invention performs pre-processing to correlate a set of input sample(s) and filter for each output sample pixel to be produced. Further efficiencies are gained by ordering the filtering process in an efficient manner and limiting the switching of filters during processing, as will be explained in more detail below.

Figure 3:
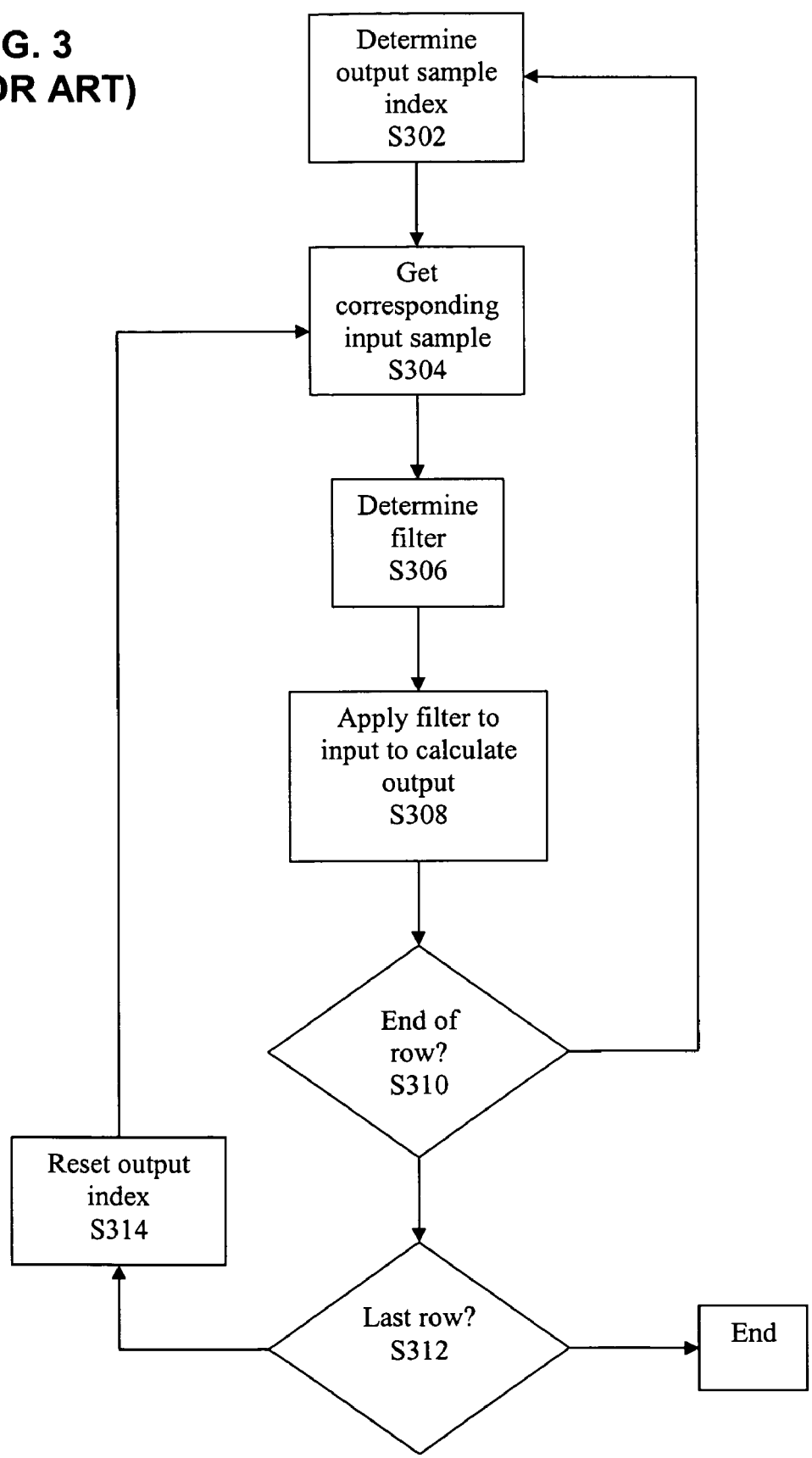
FIG. 3 is a flowchart illustrating a conventional horizontal image scaling method employing poly-phase filtering.
Figure 5:
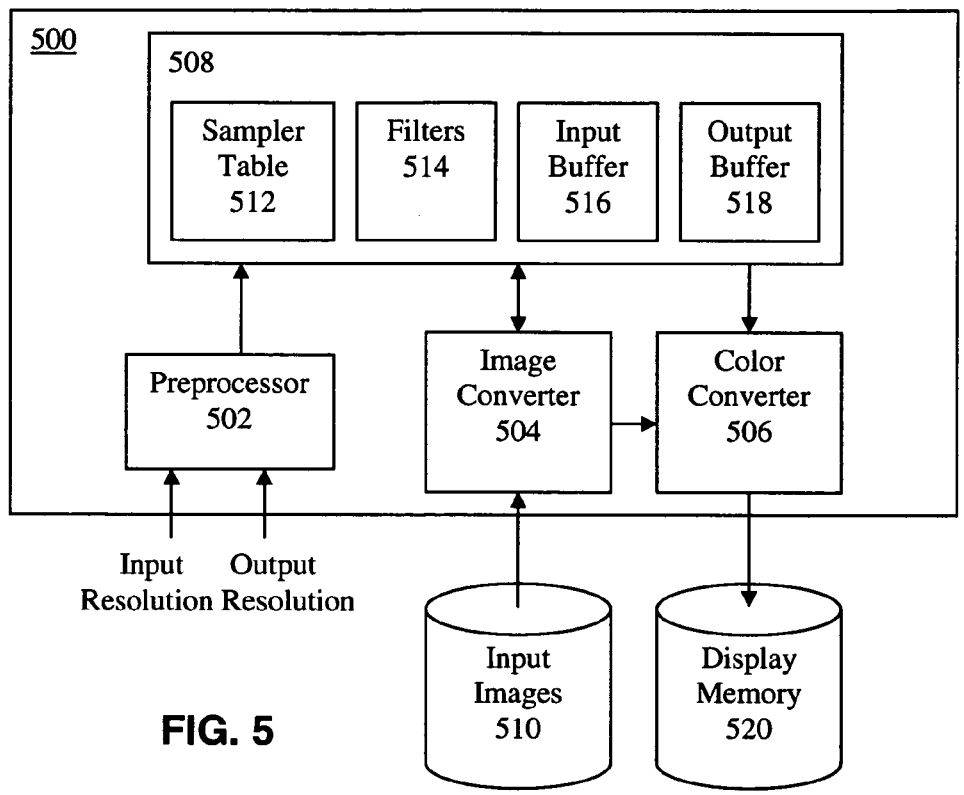
FIG. 5 is a block diagram of an image resampling apparatus in accordance with the present invention.

FIG. 5 is an example of an image resampling (i.e. sample-rate converter) apparatus in accordance with one embodiment of the invention. As shown in FIG. 5, an image resampler 500 includes a preprocessor 502, an image converter 504, a color converter 506 and an internal memory (e.g. SRAM) 508.

Generally, preprocessor 502 receives the resolutions of both the input images to be received and the output images to be produced. Using this information, as well as information about the set of filters 514 available to the scaling process, preprocessor 502 builds sampler table 512. Preferably, sampler table 512 includes, information that correlates, for each output sample in the output image to be produced, the corresponding input sample(s) in input buffer 516 from which the output sample is to be calculated, and the particular filter in the filters set 514 to be employed. It should be noted that the resolution information provided to preprocessor 502 can be in many alternative forms, such as a scale factor, and can come from many sources, including, for example, header information in an image data file.

Image converter 504 receives input images from memory 510, stores them in input buffer 516, and performs scaling operations using pre-processing data stored in sampler table 512, as will be described in more detail below. The scaled output samples are then stored in output buffer 518 and provided to color converter 506, which converts the data and stores it in display memory 520.

In one preferred embodiment of the invention, resampler apparatus 500 is comprised of a single integrated circuit (e.g. an ASIC). It should be noted that such an integrated circuit may include other functional blocks for performing other image or multimedia tasks such as JPEG/MPEG decoding, as well as control blocks for controlling the operation of apparatus 500 and managing interfaces with other components and memories. However, it should be further apparent that some or all of the functional blocks in apparatus 500 can be implemented using software executing on a processor or processor core, for example.

Figure 6:
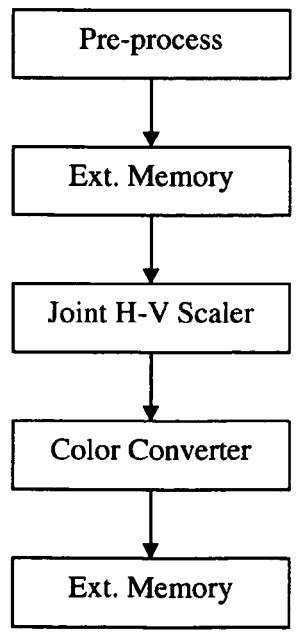
FIG. 6 is a block diagram of an image conversion pipeline according to the invention.

FIG. 6 shows an example of an overall image processing pipeline in accordance with this embodiment of the invention. In notable contrast with the prior art, the present invention includes a pre-processing stage that will set up tables for use by an image converter in a resampling process. In one example, tables can be set up for a given input resolution, output resolution, and set of filters. In another example, tables can be set up for a given known scale factor and set of filters. It should be noted that these pre-processing tables can be used for all subsequent images that need to be scaled having the same input and output image resolutions, and so the pre-processing stage need only be included once for a plurality of images.

Input images are retrieved from external memory, and scaled by a joint horizontal and vertical scaling process that will be described in more detail below, using the pre-processing tables set up in the pre-processing stage. The scaled image is then color-converted and stored in external memory for display. In accordance with certain other aspects of the invention that will be described in more detail below, the overall processing pipeline will not require image data to be temporarily written back to external memory between horizontal and vertical filtering. However, this aspect is not necessary in all embodiments of the invention. It should be further noted that the pipeline can be implemented with a JPEG or MPEG decoding process, and certain additional and novel aspects of this implementation will be described in more detail in connection with further embodiments.

Figure 7A:
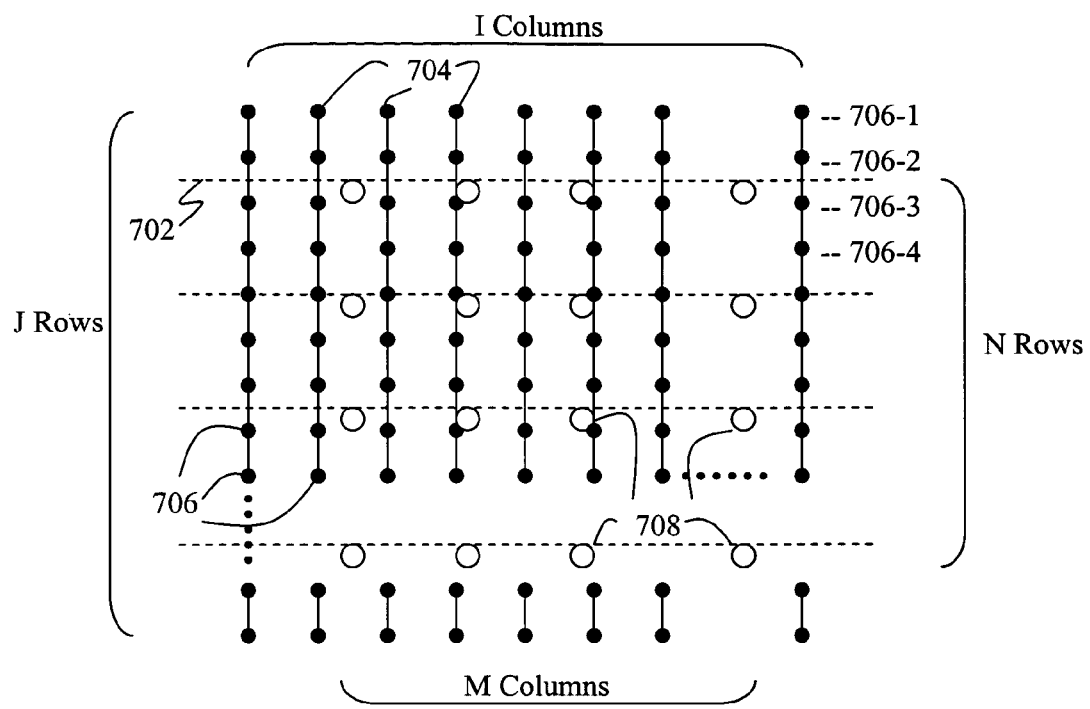
FIGS. 7A and 7B are diagrams further illustrating the sample-rate conversion techniques of the present invention.
Figure 7B:
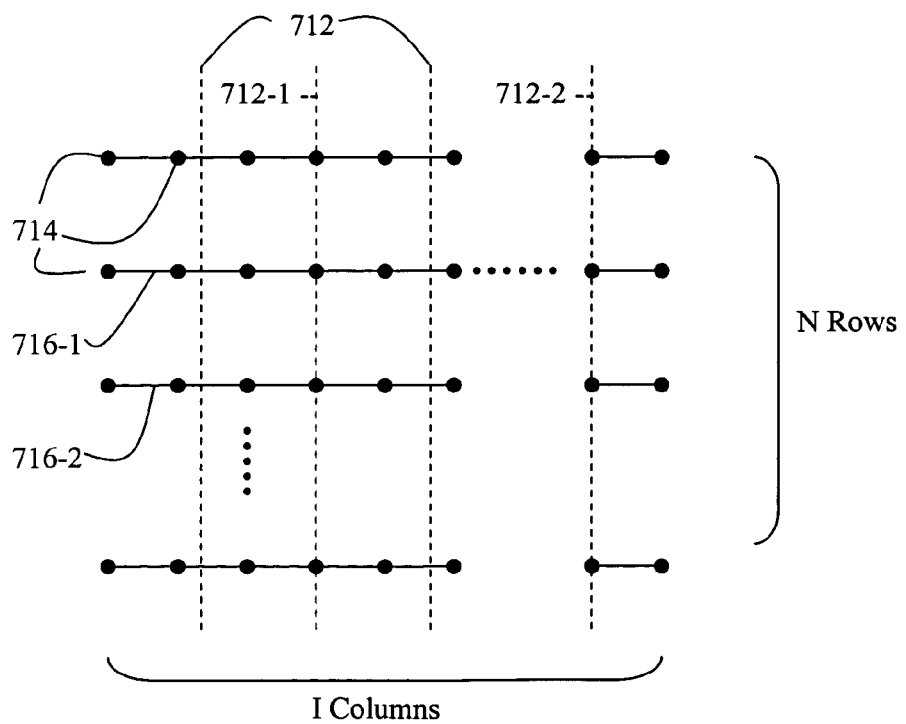

FIGS. 7A and 7B are example applications for illustrating certain principles of the present invention, and FIGS. 8A and 8B illustrate example tables that are created during pre-processing according to one embodiment of the invention.

As shown in FIG. 7A, in general, a two-dimensional sample-rate converter according to the invention will scale an input I×J array (i.e. I columns and J rows) of input pixels to an output M×N array (i.e. M columns and N rows) of output pixels. FIG. 7A shows the spatial relationship between the input pixels 706 and the output pixels 708. Although FIG. 7A shows M<I and N<J, respectively (i.e. a down-scaling example), the invention is not limited to down-scaling but can also be applied to up-scaling.

In one example of the invention, the two-dimensional image is first filtered vertically (i.e. scaling the number of rows from J to N) and then horizontally (i.e. scaling the number of columns from I to M).

For vertical filtering, the present invention recognizes that the vertical spatial relationship of the output pixels 708 of a given row, for example line 702, will be the same with respect to each column 704 of input pixels 706. For example, assuming a four-tap filter is used for scaling, the spatial relationship or phase of line 702 with respect to input pixels 706-1, 706-2, 706-3 and 706-4 used by the filter will be the same for corresponding input pixels 706 in each of the I columns 704 (i.e. the line 702 spatially intersects each column 704 at the same place). Moreover, the same filter will be used on the corresponding set of input pixels in each column 704 intersected by row 702 because of the same phase (i.e. spatial relationship) that will exist between the row 702 and input pixels in each column 704. The determination of the filter to use from a given set of poly-phase filters based on the phase can be performed in a similar manner as is performed in the prior art.

FIG. 8A illustrates an example table that is created during pre-processing and can be used during vertical filtering. As shown in the example of FIG. 8A, during pre-processing, an I×N array of pre-processing values is created, corresponding to each of the vertically-filtered output pixel values that will be created during vertical filtering. More particularly, for each of the I output pixels that will be created for a given row (1 to N), the index of the filter to use (selected on the basis of the determined phase or spatial relationship) is stored, as well as indices to the corresponding input pixels to which the filter will be applied, in the sampler table 512.

It should be noted that certain storage efficiencies can be gained based on known relationships among the input and output values, which efficiencies can lead to reduced information that actually needs to be stored in comparison to the example of FIG. 8A. For example, as shown in FIG. 8A, if all output pixels along the same row will be computed sequentially, the index of the filter may only need to be stored once for a given output row. Moreover, the index to only one of the input pixels needs to be stored if the number of taps are known, and the indices of other adjacent input pixels can be readily determined during processing. Still further, because the row indices for each of the input pixels will be the same for each output column, the input indices may only need to be stored once, resulting in storage of only one set of pre-processing values for each of the N output rows (rather than an array).

FIG. 7B illustrates the points remaining after vertical filtering, and which will be processed during horizontal filtering (i.e. reducing the I columns to M columns). As shown in FIG. 7B, after vertical filtering, there will be a I×N array of vertically-filtered pixels 714. The present invention recognizes here that the horizontal spatial relationship will be the same in each output row of pixels. In other words, the horizontal position of a given one of the M columns of output pixels, as represented by lines 712, with respect to one row of vertically-filtered pixels 714 will be the same with respect to all rows 716-1, 716-2, etc. of vertically-filtered pixels (i.e. a given column line 712 will spatially intersect each row at the same place).

Accordingly, during pre-processing, each column 712 is examined, and the horizontal spatial relationship or phase between the input vertically-filtered pixels 714 with respect to that column is examined. Based on the determined spatial relationship or phase, a filter is selected for each column 712. In one example of the invention, polyphase filtering is used, and there is a finite set F of filters available for scaling. Given that the number of filters is finite, and typically much less than the number of output pixel columns (i.e. F<<M), it is likely that several columns will require the same filter. For example, in FIG. 7B, the spatial relationship or phase of vertically-filtered pixels 714 to column 712-1 is the same as the spatial relationship or phase of vertically-filtered pixels 714 to column 712-2, and so the same filter will be selected for both output columns 712-1 and 712-2. Accordingly, for each filter f=1 to F, there will be a corresponding set of output columns among the M columns (represented by lines 712) with which the filter is associated.

In one embodiment of the invention, to reduce the need to swap filters during processing, horizontal filtering will proceed filter-by-filter, which is non-linear and non-sequential with respect to the data. Accordingly, indices that correlate the output pixels and input pixels to use for the filter will also preferably be set up during pre-processing.

FIG. 8B illustrates an example table that is created during pre-processing and can be used during horizontal filtering in one embodiment of the invention. As shown in the example of FIG. 8B, during pre-processing, a table of F sets of values are created, corresponding to each of the F poly-phase filters that are used during horizontal filtering. More particularly, for each of the F filters that will be used, the number of output columns associated with the filter (selected on the basis of the determined phase or spatial relationship) is stored. For each of the associated columns, the index of each output pixel and the corresponding vertically-filtered input pixels to which the filter will be applied, are also stored in the sampler table 512.

Figure 10A:
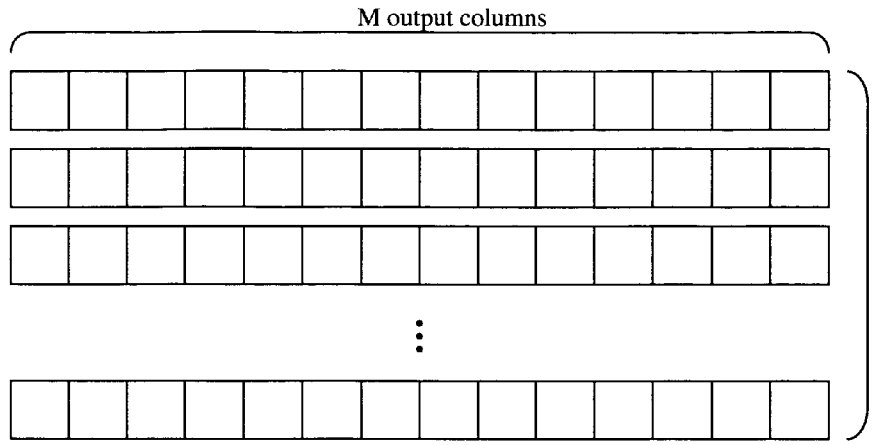
FIGS. 10A to 10C are diagrams illustrating how per-filter information stored during pre-processing is used during horizontal filtering in one example of the invention.
Figure 10B:
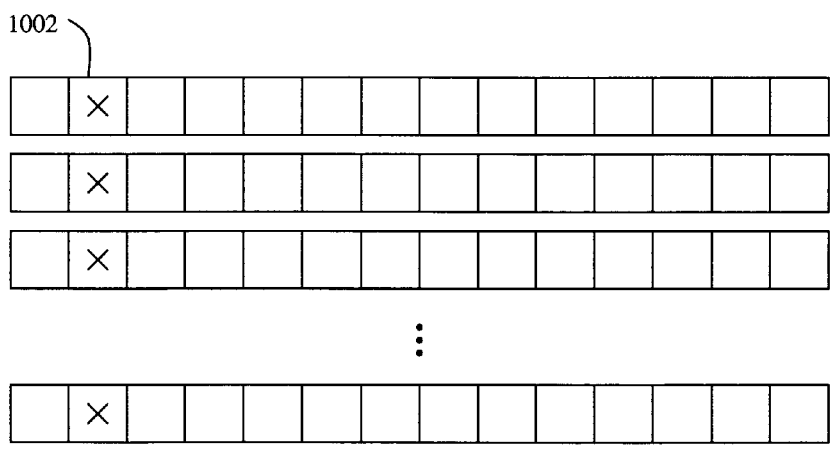
Figure 10C:
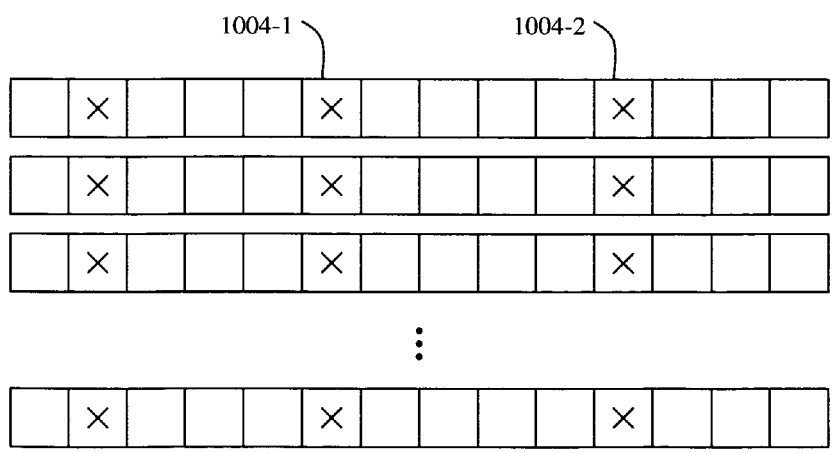

For example, as shown in FIG. 10A, during horizontal filtering, a set of M columns and N rows of output pixels will be calculated, and sampler table 512 stores information corresponding to each of the F poly-phase filters that will be used during filtering. More particularly, as shown in FIG. 10B, for example, the stored information includes the fact that filter 1 will be used for calculating values for one output column, and will further include the indices for each of the output pixels in column 1002. Accordingly, after horizontal filtering using filter 1, the values of pixels in column 1002 will be determined, whereas the output pixels in all other columns will remain undetermined. Next as shown in FIG. 10C, the tables will indicate that filter 2 will be used for two output columns, and will include information regarding the indices of output pixels in columns 1004-1 and 1004-2. Accordingly, after horizontal filtering using filter 2, the values of pixels in columns 1004-1 and 1004-2, in addition to values of pixels in column 1002, will be determined, whereas the output pixels in all other columns will remain undetermined.

Although the above description relates to an example where output pixels for all rows are calculated filter-by-filter (a method for which will be described in more detail in connection with the flowchart in FIG. 9B), this is not the only possible example. Alternatively, the same information stored in sampler table 512 can also be used to calculate output pixels for a subset of rows or even a single row. For example, to minimize storage requirements, output pixels for a single row can be calculated, and then the same processing can be used to calculate output pixels for a different single row, allowing the same storage to be overwritten and reused.

It should be noted that certain additional storage efficiencies can be gained based on known relationships among the input and output values, which efficiencies can lead to reduced information that actually needs to be stored in comparison to the example of FIG. 8B. For example, the index to only one of the input vertically-filtered pixels needs to be stored if the number of taps are known, and the indices of other adjacent input pixels can be readily determined during processing. Furthermore, because the column indices for each of the output pixels will be the same for each output row in the column, and the spatial relationship will be the same in each row of input pixels, the input and output pixel indices may only need to be stored once. Still further efficiencies can be gained with even scale factors such as 2 or 4.

Figure 9A:
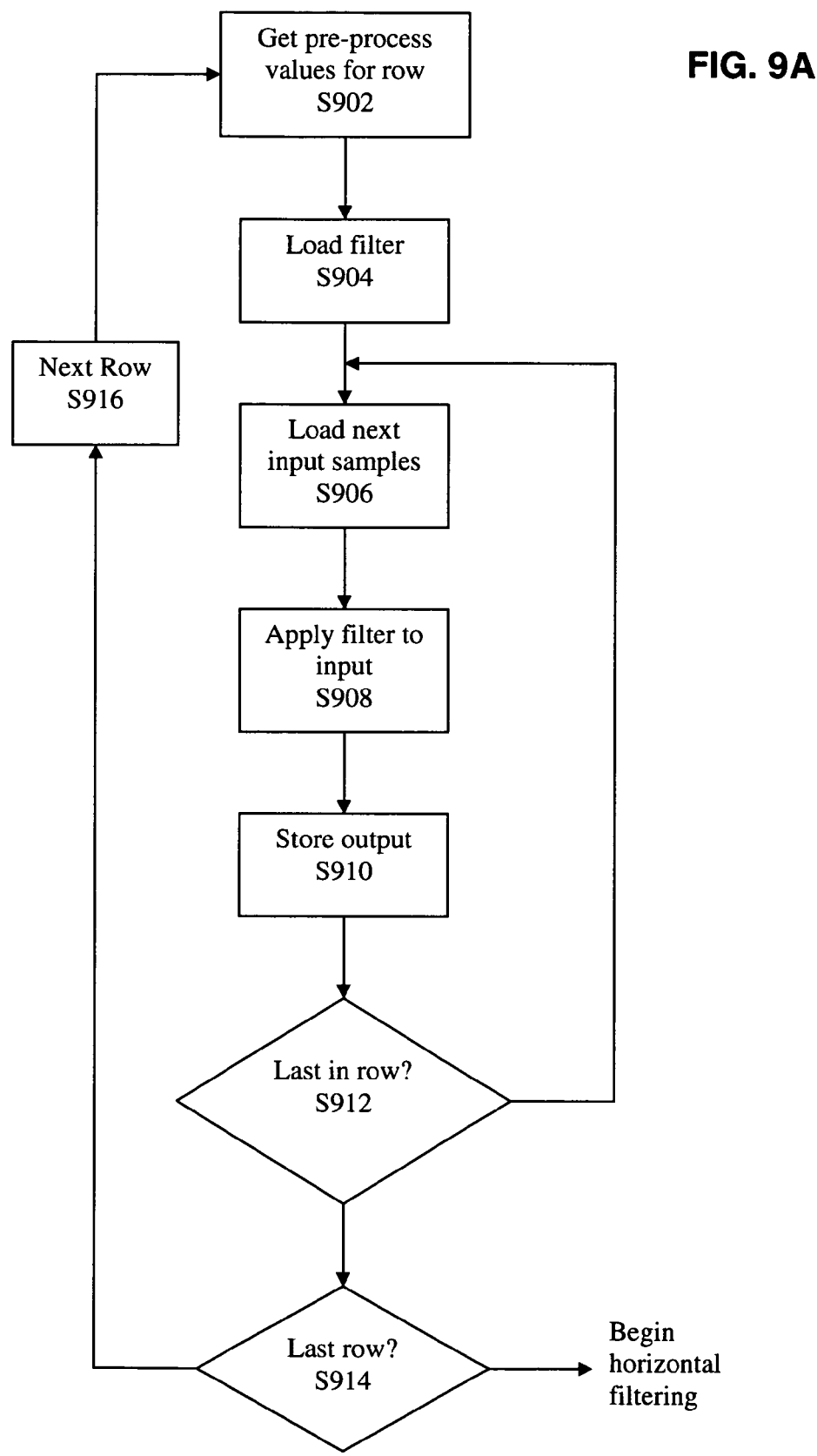
FIGS. 9A and 9B are flowcharts of an example sample-rate conversion method according to the invention.
Figure 9B:
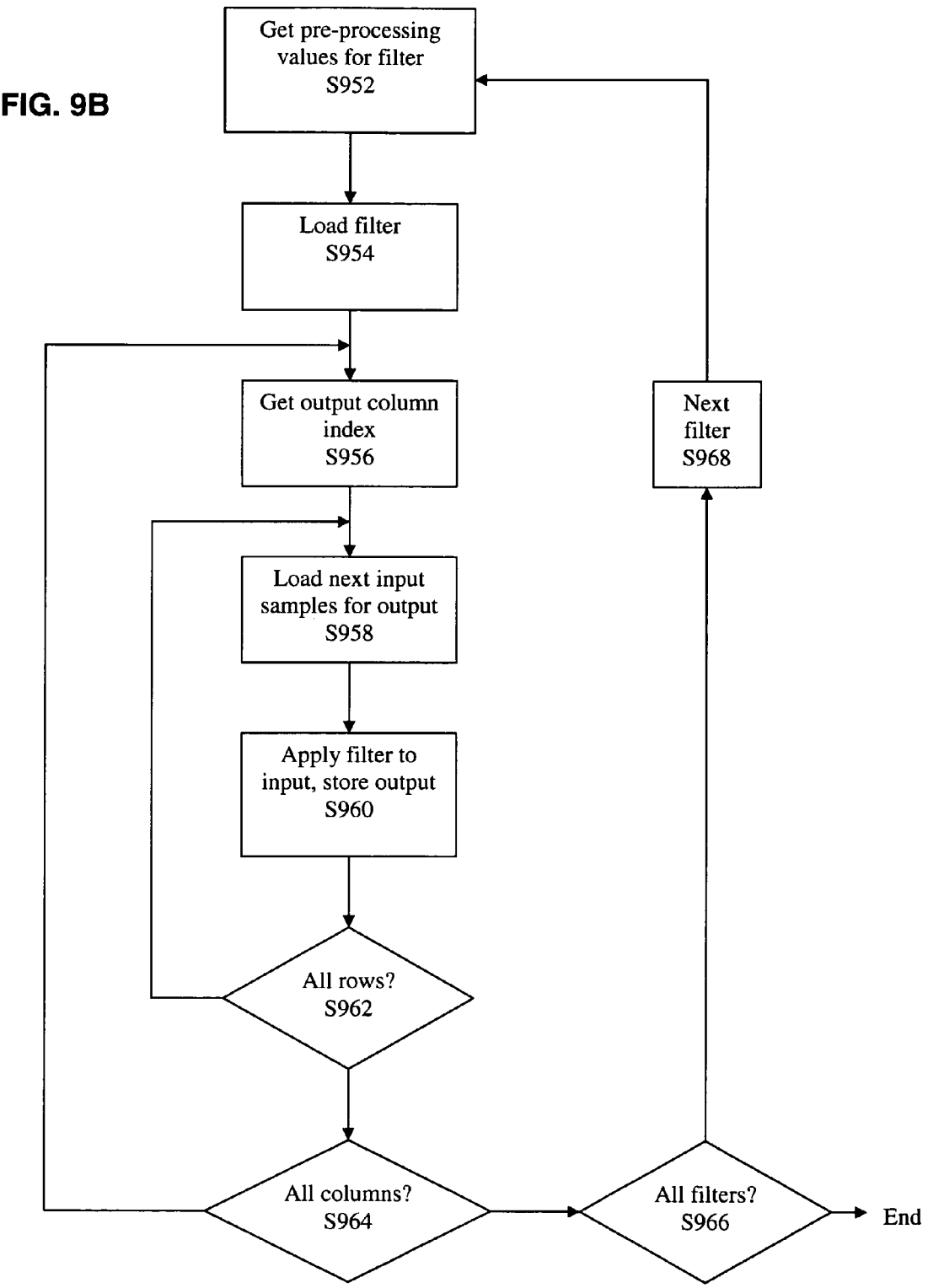

FIG. 9A is a flowchart of an example method for vertically filtering a two-dimensional image according to the invention, which method can be practiced by a re-sampling apparatus such as that described in connection with FIG. 5 and using the pre-processing tables described above in connection with FIGS. 8A and 8B.

As shown in FIG. 9A, processing begins in step S902 by retrieving the pre-processing values for the first row of output pixels. This will include the index for the first output sample to calculate. As discussed previously, the present invention takes advantage of the fact that the vertical spatial relationship of the output pixels in a given row will be the same with respect to each column of input pixels. Moreover, the same filter will be applied for the entire row. Information regarding the input pixels to use for filtering for a given output pixel and the filter to use are therefore at least included in the retrieved pre-processing values. Accordingly, the filter to use for the current output row is identified and loaded in step S904. Next, in step S906, the input pixels for producing the current vertically-filtered output pixel are loaded, the loaded filter is applied to the input pixels in step S908, and the current vertically-filtered output pixel is stored in step S910. In step S912 it is determined whether all vertically-filtered pixels for the current row have been produced. If not, the index for the next output pixel is determined and processing returns to step S906. Otherwise, if this is the last output pixel in the current row, in step S914 it is determined whether all rows of vertically-filtered pixels have been produced. If not, processing advances to step S916 where the index for the next row is determined, and then processing returns to step S902 to obtain the pre-processing values for the next row of output pixels.

Otherwise, there will now be a I×N array of vertically-filtered pixels. Processing therefore advances to horizontal filtering, an example of which is shown in FIG. 9B.

As set forth above, the present invention takes advantage of the fact that the horizontal spatial relationship will be the same in each row of vertically-filtered pixels. In other words, the horizontal position of a given column of output pixels, with respect to one row of vertically-filtered pixels intersecting that column, will be the same with respect to all rows of vertically-filtered pixels. Accordingly, the same filter can be applied to each row of vertically-filtered pixels to produce a given row of output pixels. Moreover, given that the set of poly-phase filters is finite, and typically much less than the number of output pixel columns (i.e. F<<M), it is likely that several columns will require the same filter. Accordingly, for each filter f=1 to F, there will be a corresponding set of output columns among the M columns with which the filter is associated.

According to one example of the invention, the vertically-filtered I×N array of pixels is processed filter by filter (i.e. for f=1 to F). In other words, in step S952, the first filter in the set F is selected and in step S954 it is loaded. In step S956, the first column associated with that filter is identified from the pre-processing values obtained in the initial horizontal filtering step S952. Also included in the pre-processing values, or easily derivable therefrom, are the indices of each output pixel, and the input samples to use for each output pixel. There will be one set of input samples for each row of output pixels, and so the input samples should have the same indices, which may be explicitly or implicitly specified in the pre-processing values. For a given output pixel in the current column, the input samples are loaded in step S958, and the filter is applied to them in step S960 so as to compute and store the given output pixel. In step S962 it is determined whether the filter has been applied to all respective pixels in the N output rows for that column so as to obtain a horizontally-filtered set of N output pixels for that column and filter. (As set forth above, alternatively, if only a subset of rows or a single row of output pixels is to be calculated at a time, this decision step S962 may need to be repositioned in the processing flow).

If all N output rows have not been calculated, processing returns to step S958 to compute the output pixel for the next row in the column. Otherwise, processing advances to step S964 where it is determined whether all columns associated with the filter have been processed. If not, processing returns to step S956 where the next column associated with the filter is identified, and the filter is applied to all respective pixels in the N rows for that column as well. It should be noted that the associated columns for a given filter will not necessarily be adjacent. It should be further noted that it is possible that a filter may not be associated with any columns, in which case no processing is performed in this step for that filter.

If all associated columns have been horizontally-filtered by the current filter (as determined in step S964), it is determined in step S966 whether all filters in the set F of filters have been used. If not, the next filter in the set F is selected in step S968 and horizontal filtering continues with the new filter in step S952. Otherwise, there will now be a final set of filtered M×N output pixels, and so processing ends.

It should be noted that in some applications, the number of pixel samples for a given color in an input image will not be the same. For example, with YUV 4:2:2 encoding, there will be two samples of Y for every value of U and V. Those skilled in the art will be able to understand how to apply the principles of the invention to such applications after being taught by the above descriptions, and the details thereof will be omitted here for clarity of the invention.

The present invention is also useful in image capture applications. In such applications, the image data to be re-sampled may be in a RGB format and may be arranged in memory or other data structure in a Bayer pattern, and the output data needs to be re-arranged in words containing 10 or 12 bit RGB pixel data. Those skilled in the art will be able to extend the pre-processing principles of the invention to accommodate such applications after being taught by the above examples.

The above method has been described in a general application where an entire array of input pixels is processed vertically and then horizontally. Computation efficiencies are gained by taking advantage of similarities in spatial relationships among columns and rows and by reducing the need to change filters on a pixel-by-pixel basis as is required by conventional poly-phase techniques. However, as discussed earlier, processing the entire image data can lead to inefficiencies by requiring the data to be repeatedly read and written from and to external memory in typical applications where on chip memories are limited.

To further improve the memory and bandwidth efficiency of the scaling process, in another preferred embodiment of the invention the scaler module is implemented within the JPEG/MPEG decoding process. In this example of the invention, rather than operating on an entire image at once, the scaler operates on sub-images produced by the JPEG/MPEG decoder. The scaler algorithm reads each sub-image and scales it to the desired size (which varies on an input segment basis) and writes it to the memory. Since vertical scaling may require pixel lines from segments outside the current input block, buffering techniques are employed to minimize data transfers.

Figure 11:
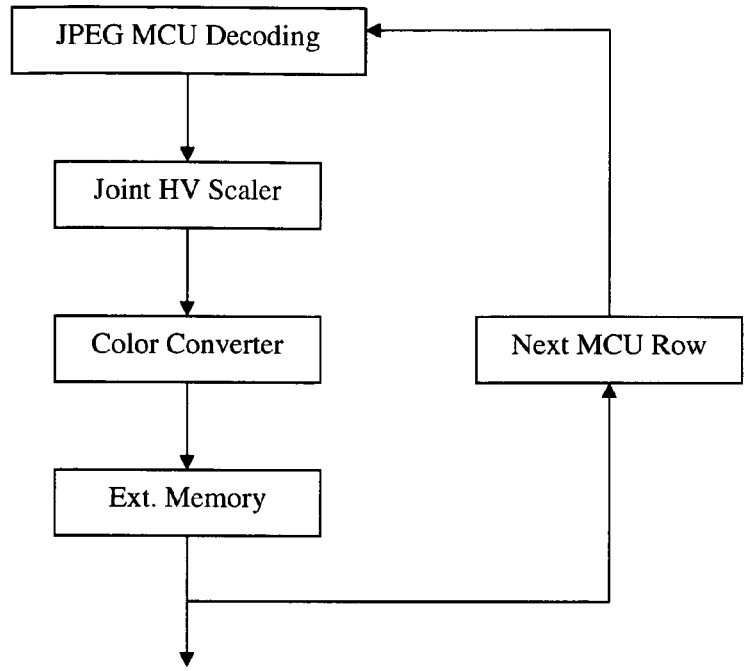
FIG. 11 is a block diagram illustrating how the techniques of the present invention can be integrated within a decoding pipeline for gaining further efficiencies.

More particularly, as shown in FIG. 11, given the image/frame to decode, a slice of two-dimensional sub-image of pixel data is decoded by the JPEG/MPEG decoder and buffered in the internal memory. In one example, the slice of two-dimensional pixel data is a row of minimum coded unit (MCU) blocks (also known as a macroblock row). For example, assume the input image size is 512×512 pixels with a YUV 4:2:2 sampling factor. This means that a row of MCU blocks is comprised of a sub-image of 512×8 pixels. In this example, the scaler module waits for a row of MCU blocks to be decoded by the JPEG/MPEG decoder, and then takes this two-dimensional sub-image to create a new sub-image with the desired size. For example, assume that the desired resolution is 352×240. That is, the 512 input pixel columns need to be down-scaled to 352 columns (ratio of 352/512) while 512 input pixel rows have to be down-scaled to 240 rows. On the average, for every 8 lines of input pixels, 3.75 lines of output pixels need to be created. Since 3.75 is not an integer, some output segments will have 3 lines while other segments will have 4 lines, etc. Accordingly, buffering needs to account for this potential discrepancy as described in more detail below. Finally, the output segments from the scaler are packed to the desired color format (e.g. conversion from YUV to RGB) along with rotation before being written to the external memory.

It should be noted that two-dimensional sub-images or slices other than entire MCU rows may be used, depending on memory or other requirements. For example, the slice to be used can be one or many MCU rows or macroblock rows. Furthermore, the sub-image can be a portion of an MCU or macroblock row, such as half of an MCU row, in which case buffering of both adjacent lines and columns may be required. It should be further noted that pre-processing is also preferably performed as described above, and can be included before, or in association with, the JPEG decoding process, and may separately account for processing of each individual color component (Y, U and V).

Figure 12:
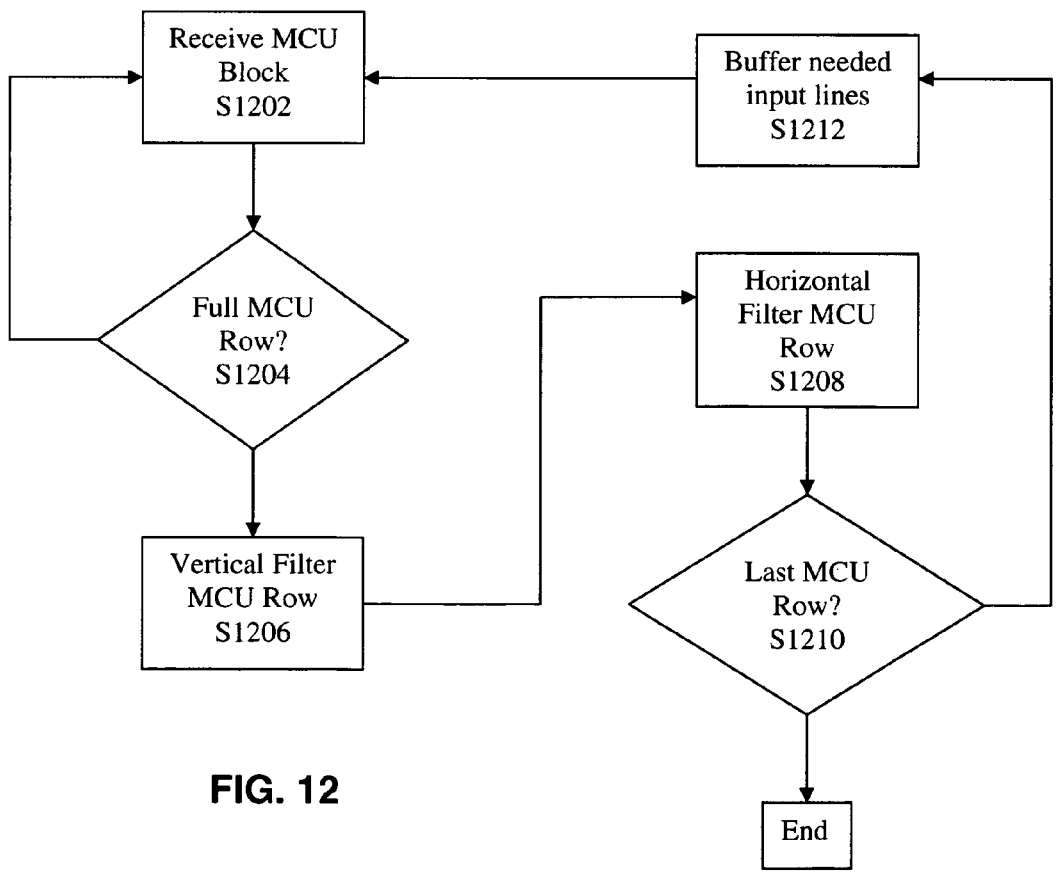
FIG. 12 is a flowchart of another example sample-rate conversion method according to the invention.

FIG. 12 is a flowchart of an example scaling method according to the embodiment of the invention illustrated in FIG. 12 where the joint horizontal-vertical scaler is implemented within the JPEG/MPEG decoding process.

More particularly, as shown in FIG. 12, given the image/frame to decode, the scaler receives MCU blocks from the JPEG/MPEG decoder in step S1202. The scaler waits until an entire MCU row of input pixels has been received and buffered in the internal memory (as determined in step S1204). The scaler module then takes this sub-image and performs vertical filtering on it in accordance with the desired output resolution in step S1206. This processing can be the same as the vertical filtering described in connection with FIGS. 7A, 8A and 9A. The scaler module then performs horizontal scaling on the vertically-filtered pixels in step S1208. This horizontal scaling can also be the same as that described in connection with FIGS. 7B, 8B and 9B. If this is the last MCU row, as determined in step S1210, processing is complete. Otherwise, the scaler waits for the next MCU row to be decoded.

Given the resolution required and the number of input lines needed for vertical filtering, the scaler may need to retain a certain number of input pixel lines for subsequent processing. Accordingly, these input lines are kept in the internal buffer in step S1212 to be used in the subsequent sub-image processing beginning in step S1206. This special handling can be recognized and determined in advance during pre-processing. Similarly, depending on the size of the input blocks, adjacent input columns on the left and right may need to be preserved and buffered, which can also be recognized and determined in advance during pre-processing.

As set forth above, a poly-phase filtering technique can be employed in the scaling methods of the present invention. In this technique, the spatial dependency of the output sample to the inputs is determined and an appropriate filter is chosen based on the spatial relationship. Typically, there are a fixed number of filters used, and a nearest neighbor algorithm is performed to determine the closest filter for the given spatial relationship. To further improve computational efficiency, filters which can be implemented without multiplication, and using only adds and shifts, are designed and used in this implementation.

According to one example, if it is determined that a given filter in a filter set with a tap multiplier of 225 would provide ideal results, another filter can be substituted instead with a multiplier of 224. Although this would not give completely ideal results, 224 equals 256 minus 32, which are both powers of 2 and can be implemented using two shifts and an add rather than a multiplication operation. Such filters can be determined heuristically for a given application, or can be derived from other sets of filters.

According to another example of the invention, the set of filters for a given application can be chosen such that saturation during filtering is avoided. Compensating for saturation during filtering processing can be an expensive operation in terms of computation time. Accordingly, filters are chosen whose coefficients will make saturation compensation unnecessary. This can be done by preparing filters with all non-negative coefficients, or whose coefficients will not result in large positive sums when applied to all input samples.

The merits of the proposed system with respect to the data movement/bandwidth and compute efficiency/latency should be apparent from the foregoing descriptions. Although video/image standards such as the MPEG/JPEG standards place some constraints on the decoding pipeline, and hence such pipelines are well specified, the present invention takes advantages of inherent similar features and data symmetries in the post-processing stages to gain efficiencies in computation, bandwidth and memory. Moreover, such efficiencies should lead to an implementation that consumes less power to achieve the same functionality.

Although the present invention has been particularly described with reference to the preferred embodiments thereof, it should be readily apparent to those of ordinary skill in the art that changes and modifications in the form and details may be made without departing from the spirit and scope of the invention. Certain aspects of one embodiment may also be interchanged with the other embodiments. It is intended that the appended claims encompass such changes, modifications and interchanges.

What is claimed is:

1. A method of converting an input image with a first resolution to an output image with a second resolution, said method comprising:
   determining, in a first stage, a first plurality of filters associated with a plurality of rows of said output image based on a respective spatial relationship between each of said plurality of rows of said output image and at least one sample of said input image;
   determining, in said first stage, a second plurality of filters associated with a plurality of columns of said output image based on a respective spatial relationship between each of said plurality of columns of said output image and at least one sample of said input image;
   calculating, in a second stage using a component of an integrated circuit, said plurality of rows of said output image using said first plurality of filters; and
   calculating, in said second stage using said component of an integrated circuit, said plurality of columns of said output image using said second plurality of filters.

2. The method of claim 1, wherein said first resolution is larger than said second resolution.

3. The method of claim 1, wherein said second resolution is larger than said first resolution.

4. The method of claim 1, wherein each of said first plurality of filters is associated with a respective tap of a first polyphase filter, and wherein each of said second plurality of filters is associated with a respective tap of a second polyphase filter.

5. The method of claim 1, wherein at least two filters of said second plurality of filters are associated with a first column of said plurality of columns.

6. The method of claim 1 further comprising:
   storing an identifier of at least one respective input sample of said input image corresponding to each output sample of said output image; and
   storing an identifier of at least one respective filter corresponding to each output sample of said output image, and wherein said at least one respective filter is selected from a group consisting of said first plurality of filters and said second plurality of filters.

7. The method of claim 6, wherein said storing an identifier of at least one respective input sample and said storing an identifier of at least one respective filter are each performed in said first stage.

8. The method of claim 1, wherein said input image is a macroblock.

9. The method of claim 1, wherein said calculating said plurality of rows further comprises calculating said plurality of rows without performing a multiplication operation, and wherein said calculating said plurality of columns further comprises calculating said plurality of columns without performing a multiplication operation.

10. The method of claim 1, wherein said calculating said plurality of rows further comprises calculating said plurality of rows to reduce saturation in said output image, and wherein said calculating said plurality of columns further comprises calculating said plurality of columns to reduce saturation in said output image.

11. A computer-readable medium having computer-readable program code embodied therein for causing a computer system to perform a method of converting an input image with a first resolution to an output image with a second resolution, said method comprising:
   determining, in a first stage, a first plurality of filters associated with a plurality of rows of said output image based on a respective spatial relationship between each of said plurality of rows of said output image and at least one sample of said input image;
   determining, in said first stage, a second plurality of filters associated with a plurality of columns of said output image based on a respective spatial relationship between each of said plurality of columns of said output image and at least one sample of said input image;
   calculating, in a second stage using a component of an integrated circuit, said plurality of rows of said output image using said first plurality of filters; and
   calculating, in said second stage using said component of an integrated circuit, said plurality of columns of said output image using said second plurality of filters.

12. The computer-readable medium of claim 11, wherein said first resolution is larger than said second resolution.

13. The computer-readable medium of claim 11, wherein said second resolution is larger than said first resolution.

14. The computer-readable medium of claim 11, wherein each of said first plurality of filters is associated with a respective tap of a first polyphase filter, and wherein each of said second plurality of filters is associated with a respective tap of a second polyphase filter.

15. The computer-readable medium of claim 11, wherein at least two filters of said second plurality of filters are associated with a first column of said plurality of columns.

16. The computer-readable medium of claim 11, wherein said method further comprises:
    storing an identifier of at least one respective input sample of said input image corresponding to each output sample of said output image; and
    storing an identifier of at least one respective filter corresponding to each output sample of said output image, and wherein said at least one respective filter is selected from a group consisting of said first plurality of filters and said second plurality of filters.

17. The computer-readable medium of claim 16, wherein said storing an identifier of at least one respective input sample and said storing an identifier of at least one respective filter are each performed in said first stage.

18. The computer-readable medium of claim 11, wherein said input image is a macroblock.

19. The computer-readable medium of claim 11, wherein said calculating said plurality of rows further comprises calculating said plurality of rows without performing a multiplication operation, and wherein said calculating said plurality of columns further comprises calculating said plurality of columns without performing a multiplication operation.

20. The computer-readable medium of claim 11, wherein said calculating said plurality of rows further comprises calculating said plurality of rows to reduce saturation in said output image, and wherein said calculating said plurality of columns further comprises calculating said plurality of columns to reduce saturation in said output image.

21. A system for converting an input image with a first resolution to an output image with a second resolution, said system comprising:
    means for determining, in a first stage, a first plurality of filters associated with a plurality of rows of said output image based on a respective spatial relationship between each of said plurality of rows of said output image and at least one sample of said input image;
    means for determining, in said first stage, a second plurality of filters associated with a plurality of columns of said output image based on a respective spatial relationship between each of said plurality of columns of said output image and at least one sample of said input image;
    means for calculating, in a second stage, said plurality of rows of said output image using said first plurality of filters; and
    means for calculating, in said second stage, said plurality of columns of said output image using said second plurality of filters.

22. The system of claim 21, wherein said first resolution is larger than said second resolution.

23. The system of claim 21, wherein said second resolution is larger than said first resolution.

24. The system of claim 21, wherein each of said first plurality of filters is associated with a respective tap of a first polyphase filter, and wherein each of said second plurality of filters is associated with a respective tap of a second polyphase filter.

25. The system of claim 21, wherein at least two filters of said second plurality of filters are associated with a first column of said plurality of columns.

26. The system of claim 21 further comprising:
    means for storing an identifier of at least one respective input sample of said input image corresponding to each output sample of said output image; and
    means for storing an identifier of at least one respective filter corresponding to each output sample of said output image, and wherein said at least one respective filter is selected from a group consisting of said first plurality of filters and said second plurality of filters.

27. The system of claim 26, wherein said means for storing an identifier of at least one respective input sample and said means for storing an identifier of at least one respective filter are each used in said first stage.

28. The system of claim 21, wherein said input image is a macroblock.

29. The system of claim 21, wherein said means for calculating said plurality of rows further comprises means for calculating said plurality of rows without performing a multiplication operation, and wherein said means for calculating said plurality of columns further comprises means for calculating said plurality of columns without performing a multiplication operation.

30. The system of claim 21, wherein said means for calculating said plurality of rows further comprises means for calculating said plurality of rows to reduce saturation in said output image, and wherein said means for calculating said plurality of columns further comprises means for calculating said plurality of columns to reduce saturation in said output image.

* * * * *